(12) United States Patent
Helvajian

(10) Patent No.: US 10,416,304 B2
(45) Date of Patent: Sep. 17, 2019

(54) AUTOMOBILE ACCIDENT MITIGATION TECHNIQUE

(71) Applicant: The Aerospace Corporation, El Segundo, CA (US)

(72) Inventor: Henry Helvajian, Pasadena, CA (US)

(73) Assignee: The Aerospace Corporation, El Segundo, CA (US)

( * ) Notice: Subject to any disclaimer, the term of this patent is extended or adjusted under 35 U.S.C. 154(b) by 263 days.

(21) Appl. No.: 15/450,968

(22) Filed: Mar. 6, 2017

(65) Prior Publication Data

US 2018/0252808 A1 Sep. 6, 2018

(51) Int. Cl.
*G01S 13/93* (2006.01)
*G01S 13/60* (2006.01)

(52) U.S. Cl.
CPC .......... *G01S 13/931* (2013.01); *G01S 13/605* (2013.01); *G01S 2013/9339* (2013.01); *G01S 2013/9353* (2013.01); *G01S 2013/9357* (2013.01)

(58) Field of Classification Search
CPC .................................................... G01S 13/605
See application file for complete search history.

(56) References Cited

U.S. PATENT DOCUMENTS

| | | | | | |
|---|---|---|---|---|---|
| 4,310,789 | A | * | 1/1982 | Mank | G05D 1/0265 180/168 |
| 5,136,225 | A | * | 8/1992 | Heddebaut | G05D 1/0265 180/168 |
| 5,308,186 | A | * | 5/1994 | Hedgewick | E01F 9/553 404/14 |
| 5,501,545 | A | * | 3/1996 | Walter | G02B 5/124 359/531 |
| 6,336,064 | B1 | * | 1/2002 | Honkura | G01C 21/26 180/167 |
| 6,894,717 | B2 | | 5/2005 | Bakewell | |
| 6,971,464 | B2 | * | 12/2005 | Marino | B60T 7/16 180/167 |
| 8,306,683 | B2 | | 11/2012 | Simmons | |
| 8,521,411 | B2 | | 8/2013 | Grabowski et al. | |
| 9,235,987 | B2 | | 1/2016 | Green et al. | |
| 2002/0186297 | A1 | | 12/2002 | Bakewell | |
| 2008/0272955 | A1 | * | 11/2008 | Yonak | G01S 13/931 342/54 |
| 2009/0005961 | A1 | | 1/2009 | Grabowski et al. | |
| 2009/0062986 | A1 | | 3/2009 | Simmons | |
| 2013/0131905 | A1 | | 5/2013 | Green et al. | |

(Continued)

OTHER PUBLICATIONS

"Autonomous Car" access at https://en.wikipedia.org/wiki/Autonomous_car and accessed on Oct. 17, 2016.

(Continued)

*Primary Examiner* — Marcus E Windrich
(74) *Attorney, Agent, or Firm* — LeonardPatel PC

(57) ABSTRACT

A system for reducing accidents caused by distracted drivers. The system may form an invisible track using material-impregnated grooves and a radar beam, preventing a vehicle from veering away from a road lane. The material-impregnated grooves (MIGs) within one or more road lanes may include scrap metal. The radar beam may be emitted from a transceiver mounted underneath the vehicle such that backscatter from the MIGs is returned to the transceiver.

22 Claims, 5 Drawing Sheets

(56) References Cited

U.S. PATENT DOCUMENTS

| | | | |
|---|---|---|---|
| 2013/0335213 A1* | 12/2013 | Sherony | G08G 1/167 |
| | | | 340/439 |
| 2014/0022109 A1 | 1/2014 | Lee et al. | |
| 2014/0350793 A1* | 11/2014 | Schrabler | G01S 7/006 |
| | | | 701/41 |
| 2015/0145711 A1* | 5/2015 | Maddox | G01S 13/931 |
| | | | 342/27 |
| 2015/0187019 A1 | 7/2015 | Fernandes et al. | |
| 2015/0303581 A1* | 10/2015 | Bodo | G01S 13/426 |
| | | | 342/7 |
| 2016/0068156 A1 | 3/2016 | Horii | |
| 2016/0075192 A1 | 3/2016 | Schofield et al. | |
| 2016/0231746 A1 | 8/2016 | Hazelton et al. | |

OTHER PUBLICATIONS

"How It Works—Google Self-Driving Car Project" accessed at https://www.google.com/selfdrivingcar/how/ and on Oct. 17, 2016.
"Roads That Work for Self-Driving Cars" accessed at http://www.wsj.com/articles/roads-that-work-for-self-drivingcars-1467991339; updated Jul. 8, 2016.

\* cited by examiner

AUTOMOBILE ACCIDENT MITIGATION TECHNIQUE

FIELD

The present invention relates to mitigating automobile accidents, and more particularly, to mitigating automobile accidents resulting from driver distractions.

BACKGROUND

The number one cause of vehicle accidents in the United States is the result of distracted drivers. For example, drivers may be distracted for various reasons such as text messaging, grooming, talking to passengers, eating, etc.

Literature search shows that technology advances for safety/warning systems located in the car far exceed those positioned along the road. From a business perspective, one can understand this trend. Each car owner decides, based on his or her willingness to pay for safety-system accessories, while the development of a sensor-rich road requires the use of public funds and politics.

Consequently, safety-system advances continue to be added to cars. However, most safety-system advances have some type of handicap. For example, situational-sensors installed in the vehicle (e.g., cameras, LIDAR, etc.) must be used to ascertain the road terrain prior to sending a warning signal. The computation time required to conduct a road terrain analysis limits the response time even for such an automated system. Moreover, many of the situational-awareness systems become severely handicapped by snow, rain, dust, or if painted road markers have been scrubbed off due to wear and tear on the road.

Thus, a more efficient approach may be beneficial.

SUMMARY

Certain embodiments of the present invention may provide solutions to the problems and needs in the art that have not yet been fully identified, appreciated, or solved by current vehicle safety systems. For example, embodiments of the present invention generally pertain to a cost-effective solution addressing distracted driver accidents.

In one embodiment, a system may reduce distracted driver accidents. For example, the system may form an invisible track using material-impregnated grooves (MIGs) and a radar beam (e.g., pulsed or continuous wave (CW)), preventing a vehicle from veering away from a road lane. The material within the MIGs may include scrap metal. The radar beam may be emitted from a transceiver mounted underneath the vehicle such that a backscatter signal from the MIGs is returned to the transceiver.

In another embodiment, a system may mitigate accidents caused by a distracted driver. The system may include a plurality of grooves within one or more road lanes. Each of the plurality of grooves are filled and sealed with scrap metal. The system may also include a transceiver mounted on an underside of a vehicle. The transceiver may be positioned at an angle to emit a beam such that backscatter from the sealed scrap metal is returned to the transceiver for corrective vehicle measures.

In another embodiment, a system may enable near autonomous motion of service vehicles within a large and restricted facility such as airports, shipyards, theme parks, etc. The system may include a plurality of grooves within one or more road lanes. Each of the plurality of grooves are filled and sealed with scrap metal. The system may also include a transceiver mounted on an underside of a vehicle. The transceiver may be positioned at an angle to emit a beam such that backscatter from the sealed scrap metal is returned to the transceiver for corrective vehicle measures.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1A:
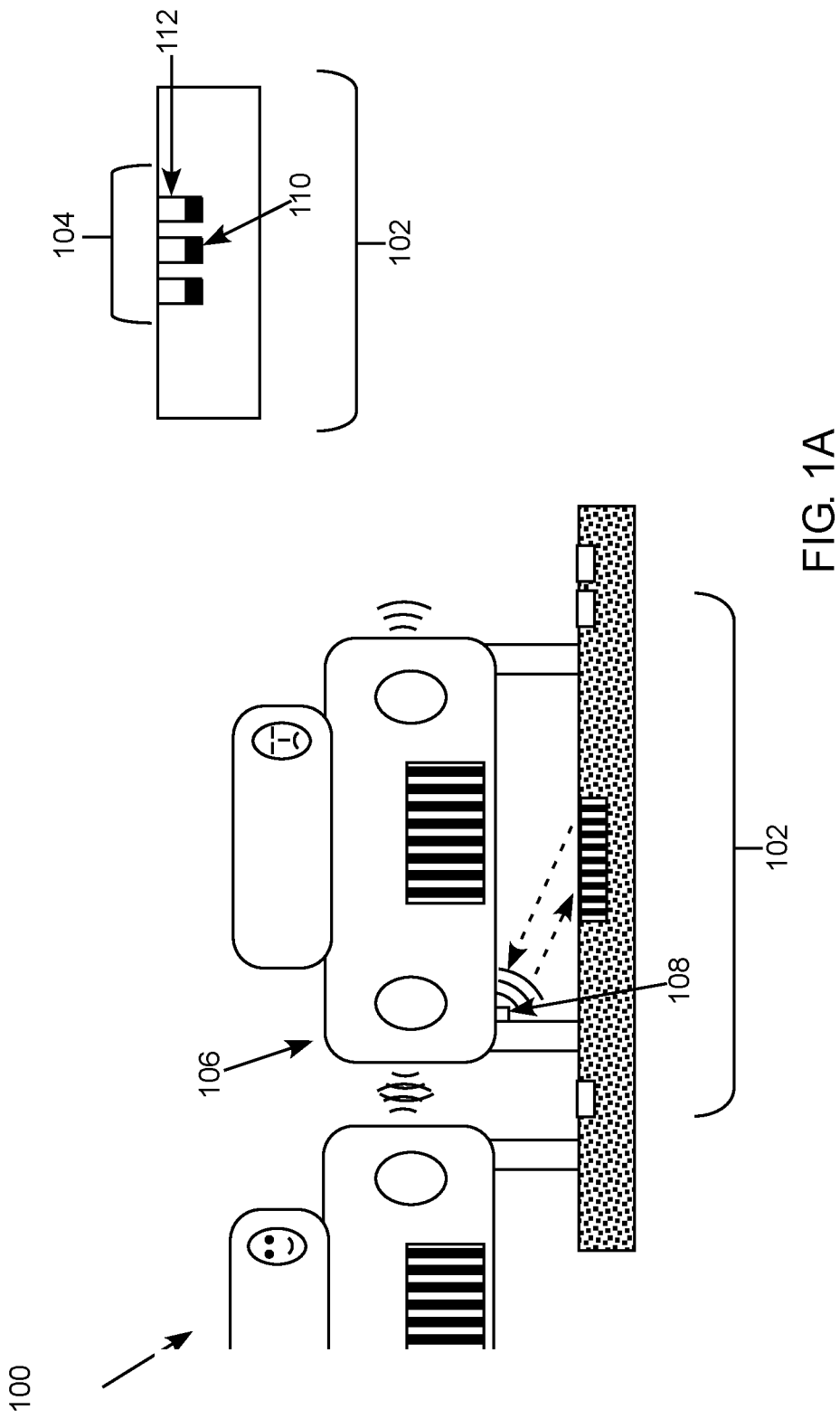
FIG. 1A is a cross-sectional view of a vehicle correction (or warning) system used on a two-lane roadway, according to an embodiment of the present invention.

Some embodiments of the present invention generally pertain to a warning system for reducing accidents by distracted drivers. For example, the warning system utilizes the road and vehicle to provide "signals" that enable an automated corrective maneuver on a relevant time scale, reducing the number of accidents caused by distracted drivers.

To reduce the overall cost, the needed modifications to a road pavement are modest, and may easily be a part of the ongoing pavement repairs managed by State Transportation authorities and guided by the National Highway Transportation Safety Administration (NHTSA). For example, roads are routinely grooved (e.g., continuous parallel slots in the pavement cut by multi-blade saws) to enhance tire-friction in both dry and wet conditions. These grooves also reduce the road noise. Pavements have been grooved since 1965, and therefore, the overall cost to implement the embodiments described herein are modest.

The warning system may include at least 3 grooved lines on a road lane filled with material and sealed (e.g., MIGs). In some embodiments, scrap metal may be used to fill the grooves. For example, shredded scrap metal or scrap metal turnings may be used depending on the configuration of warning system. Scrap metal, and more specifically, scrap metal turnings may reduce the cost of implementation. For example, scrap metal in the United States is produced in abundance supply per year, and therefore, is a readily available resource, reducing the overall cost to implement the warning system.

The warning system may include a transceiver (e.g., a 24 GHz radar transceiver) mounted on the underside of the vehicle. This may be similar to the transceiver currently being used for "blind-spot" monitoring. In some embodiments, the transceiver emits a radar beam (e.g., with directionality set either by physical alignment or by electronic steering) such that the key backscatter from the MIGs is directly returned to the transceiver. The radar beam may be continuously or periodically transmitted to the MIGs in certain embodiments. In optics, a configuration in which the backscatter (or return) signal is reflected back toward the source is known as Littrow condition. The MIGs in combination with the radar beam may produce an "invisible track", providing the vehicle with near instant access to the road path. This way, when the vehicle wanders away from the track, a signal may be produced. This signal, coupled with other in-car sensors, may determine if temporary seizure of driver control is warranted. This configuration may be applicable for all weather conditions such as rain, dry, humid, snow, sand storm, etc.

In certain embodiments, the warning system may transfer momentary control to the automobile for corrective maneuver after an on-board sensor determines that there is a lapse of driver attention. It should be appreciated that the warning system is not limited to urban environments, and may be implemented on any road. The MIGs may be used by an onboard sensor to keep the vehicle within the lane markers. For example, the invisible track may include a series of (at least 3) MIGs that have been partially filled with scrap metal and sealed. In some embodiments, the onboard sensor, such as a multichannel mid-wavelength (e.g., K band) radar transceiver, may be located beneath the vehicle, and may be electronically or mechanically angled such that a large portion of the directed output beam returns to the sensor. The selection of the radar band (e.g., K band) takes into consideration these properties. For example, the shorter the radar wavelength (i.e., higher the frequency), the smaller is transmit and receive antenna. As of this date, the shorter the radar wavelength (i.e., the higher the frequency), the higher the cost and the higher the attenuation of the radar beam while transmitting through, water, snow, dirt, etc.

While certain embodiments utilize 24 GHz band technology, other embodiments may utilize a different frequency (e.g., 77 GHz) depending on the configuration of the warning system. Certain embodiments may use 24 GHz band technology, since 24 GHz technology is commercially available and already used in automobiles, thus reducing the overall cost for implementation. For best signal to noise ratio, there should be a relationship between the choice of the wavelength (e.g., a 24 GHz frequency band) and the groove separation "d". The optimum is when the groove separation "d" matches that of the wavelength (e.g., 24 GHz=1.25 cm wavelength or ~0.5" groove separation).

The amplitude of the return signal, normalized for surface reflectivity, may be used to determine if the car is "coupled" to the "invisible track". A number of approaches maybe used to determine an inadvertent lane change. For example, the warning system may determine if the driver has his or her signal indicator on. Another approach may include mounting a camera that looks at the drivers face and eye lids or monitor whether there are cars alongside (i.e., blind side). A further example may include reviewing the road mapping such that the navigation system knows if the car is in the fast lane, and if so, then a transition to the opposing side may be prevented.

Another approach is to monitor the drift-rate away from the "invisible track" using the onboard computing system in certain embodiments. For example, when the rate is quick, the assumption is that the driver has exerted a controlled command. In contrast, a slow drift-rate infers that the driver has exerted an uncontrolled command, i.e., the movement of the vehicle is not controlled by the driver. The average human can respond to a visual cue in about 250 msec, and 170 msec is only needed to respond to audio stimulation and 150 msec is only needed to respond to a touch stimulus. In an embodiment, if the drift rate (depending on the car speed) is slower than 250 msec, it is safe to say that the movement is not controlled by the driver.

When a broadband light source, such as an electromagnetic wave like radio frequency (RF), hits a corrugated structure, the incident light is reflected (or dispersed) into multiple modes (m) called "grating orders". The reflected angle of the grating order depends on the incident angle ($\theta$), the wavelength ($\Lambda$), and index of refraction (n) of the material the light is passing through (e.g., for air ~n=1). The brightest reflected order is labeled as mode m=0, which is the standard reflection, and the next brightest reflected orders are labeled as m=+1 modes.

By knowing the wavelength and line-ruling period, conditions may be set. For example, for a given incident angle (C), where the m=+1 order is to be directly reflected back, is called the Littrow condition. Just as light reflects more from a metalized surface, RF wavelengths may reflect more efficiently from metals. For example, if a surface is patterned with identical parallel lines (e.g., a line-ruled pattern) that are metallic, the signal return can be analyzed similar to the operation of a grating order in the optical domain.

At K-band, the RF wavelengths (e.g., 24 GHz has a wavelength $\Lambda$=12.5 mm=½") have dimensions on the order of road pavement grooving (e.g., ½"-1" spacing). K-band RF may have other properties relevant to the warning system. For example, for a radar transceiver at 24 GHz, the attenuation in the atmosphere at sea level is 0.2 dB/km ((a 10 dB loss (or −10 dB)=power ratio (Power return/Power sent) of 0.1, an iPhone® can pick up GPS signals ~−95 dBm or dB referenced to 1 mW)). Also, the attenuation through concrete may be ~15 dB/m and ~18 dB/m for gypsum (walls), and may be ~2.1 dB/km through thick fog (e.g., Cumulonimbus at −8 C) and 6 dB/km for dust when the visibility is just 10 m (~30 feet). Further, the attenuation may also be 1 dB/m for packed snow and 5 dB/m for fine snow. Finally, the attenuation may be ~24 dB/m for a slab of ice but ~10 dB/millimeter for liquid water.

While the attenuation is high for standing liquid water, given the ability of modern signal processing circuits to dig out weak signals, the warning system may operate even if a few mm of standing water is present. For example, and for purposes of explanation, an iPhone's® capability of picking up GPS signals is at −95 dBm. Tire treads are typically designed to push out water to get traction, so it may be conceivable that careful placement of the transceiver could further utilize this function of the tire during rain to increase the signal return. Finally, the NHTSA along with many State Transportation Administrations have recommended grooving of roads. For example, airports have them by FAA mandate. The grooves are typically placed near the edges of the lanes to enhance friction (during rain) and it has been recorded that it also reduces noise.

To test the feasibility of the warning system, a systems level calculation was carried out. For a grooved road, such as asphalt or concrete, 3 grooves were filled with a scrap metal additive to 50 percent volume fraction, and the scrap metal impregnated grooves or MIGs were spaced ~1.25 cm (or ½ in) apart with groove opening and depth of 3.2 mm (⅛ in). For this system level calculation, if the MIGs are irradiated with a 24 GHz ($\Lambda$=1.25 cm) RF source, besides the reflected component (m=0 mode), there is only one other reflected mode (m=+1). Further, if the 24 GHz radiation is at an incident angle of 30 degrees, the m=+1 reflection is directed backwards (i.e., Littrow condition) into the source with a spatial intensity distribution as that for a 3-slit optical source. See, for example, FIG. 2.

For analysis purposes, consider the location of the MIGs to be midway along a roadway lane. Then, for Littrow condition to be met, the 24 GHz transceiver, with 7.38° cone-beam width at 3 dB, may be placed 0.11 m (4.43 in) from the center line of the car. See, for example, FIGS. 1A and 1B. This calculation used the average ground clearance for passenger autos (0.195 m (7.68 in)). However, for higher ground clearance vehicles, the transceiver may be at a different location.

It should be appreciated that in some embodiments if the radar transceiver is a 1 W source with a receiver gain of 10, the estimated maximum power of the return-signal at the sensor is 39 nW. If this is compared with an 802.11 wireless network receiver, the minimum requirement for signal power of such a wireless network receiver is 0.0001 nW. A reliable GPS receiver can operate at a power level of −127.5 dBm or 0.000000187 nW. Finally, the natural thermal "noise" floor, in a 1 Hz BW at 20 C, is 0.000000000004 nW. If the sensing electronics is not much better than a wireless network receiver, then the warning system may still operate while absorbing −50 dB loss (i.e., round trip attenuation). This would mean that the warning system may be used while driving over a slab of ice that is 1 meter thick. However, under these conditions the angle of the transceiver may have to be altered to meet the Littrow conditions. Electronic or phase array control of the angle would be helpful.

Figure 1B:
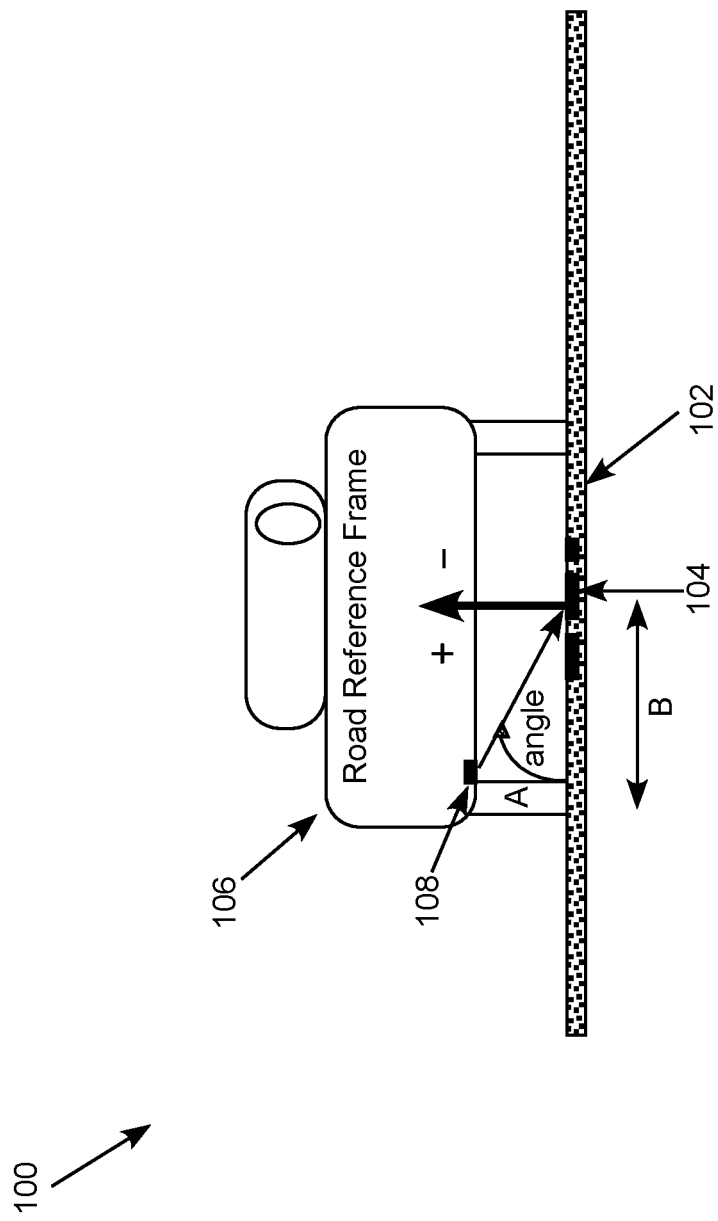
FIG. 1B is a cross-sectional view of warning system 100 used on the roadway, according to an embodiment of the present invention.

FIGS. 1A and 1B are diagrams illustrating a warning system 100 for distracted drivers, according to an embodiment of the present invention. In FIG. 1A, a roadway is shown with two-lanes, separated by a single line, traveling in a single direction. The counter travel traffic is partly shown as a segment to the right of the double lines (to be perceived as yellow) on the road. Each lane 102 may include a plurality of grooves 104 that have been impregnated with material 110. This may be referred to as material impregnated grooves (MIGs). Although FIG. 1A shows that grooves 104 are situated in the center of road lane 102, one of ordinary skill in the art will appreciate that grooves 104 may be situated at any location on road lane 102 including near where the tires touch the surface. It should further be understood that a roadway or highway with multiple road lanes will each have grooves.

As discussed above, grooves 104 may be filled with material 110 and sealed with a sealant 112. In some embodiments, scrap metal may be used as material 110. In theory, any material that reflects the RF wavelength should work, with scrap metal being considered as the most cost effective solution. For example, a quarter of an inch of material 110 may be inserted and sealed within grooves 104. If material 110 is scrap metal, then the scrap metal may be in granulated form, and sealant 112 may be some form of a polymer or paint. For example, a paste may be developed using sealant 112 and scrap metal turnings, allowing the paste to be inserted within grooves 104. Material 110 together with grooves 104 may be referred to as material-impregnated grooves (MIGs).

In another embodiment, grooves 104 may be positioned such that the wheel of vehicle 106 traverses grooves 104. This way, the wheel in front of vehicle 106 may squeeze water out of grooves 104, to enable the RF wave to interact with the sealed material 110. Using this configuration, transceiver 108 depending on placement may receive a return signal even in the harshest of environments. This may further minimize the attenuation, water problem, for example.

On the under mount of vehicle 106 is transceiver 108. Transceiver 108 may be position at a predetermined angle, such that the emitted beam hits sealed material 110 within grooves 104. For example, transceiver 108 may be placed approximately 4 inches from the center of road lane and angled such that the emitted beam hits grooves 104. Upon interaction, a backscatter is returned to transceiver 108. This returned backscatter, when the angle is correct, is known as Littrow configuration in optics, where the backscatter can be maximized.

The angle can be determined from what is known as the grating equation.

$$d(\sin(\alpha)+\sin(\beta))=m\lambda \quad \text{Equation (1)}$$

where "d" is the corrugation pitch (i.e., groove spacing), $\alpha$ is the incident angle of the transceiver wave, $\beta$ is the angle of the reflected wave from the MIGs, "m" is the grating order, and $\lambda$ is the wavelength of the transceiver wave. Since it is important to have the Littrow condition where the incident and reflected waves are at the same angle, the equation reduces to $2d\sin(\alpha)=m\lambda$. If we choose to have the first grating order reflected back (m=+1) and then choose "d"=$\lambda$ (the corrugation pitch equal to the wavelength of the transceiver), then the equation is solvable $\sin(\alpha)=\frac{1}{2}$ with $\alpha$=30 degrees.

Transceiver 108 may operate on a RF frequency, or some other type of frequency that would enable warning system 100 to determine whether vehicle 106 movement is caused by driver distraction. The frequencies may be on the order of a medium wavelength, medium range radar, and may be above 10 GHz in certain embodiments. Simply put, the placement of transceiver 108, including the angle and frequency of transceiver 108, is determined by the location of grooves 104 and the groove pitch.

In an alternative embodiment, transceiver 108 may be on a swivel or via electronic steering such that transceiver 108 auto-aligns with center of road lane 102, and more particularly, with grooves 104. For example, as transceiver 108 is auto-aligning, warning system 100 continuously monitors the strength of the return signal. By determining the angle at which the return signal was at its strongest, transceiver 108 may auto-align to the angle corresponding to the strongest return signal that was returned. A similar technique may be carried out to determine when the driver is distracted, e.g., by measuring the return signal strength.

As vehicle 106 is moving, warning system 100 continuously determines if the vehicle is in the center of road lane 102. If vehicle 106 makes an abrupt movement, the warning system may disregard the movement of vehicle 106, allowing the vehicle driver to make a lane change, for example. If there is a slow trend move of vehicle 106, warning system 100 may determine that the driver of vehicle 106 is distracted or not paying attention. Warning system 100 in this case may attempt to correct the slow trend movement of vehicle 106. Correction may occur in one or more possible ways. For example, warning system 100 may send a signal (e.g., audible signal, vibrating signal, or both) to the driver, alerting the driver of the slow trend movement. Warning system 100 may also try to temporary take over control of vehicle 106 from driver, preventing vehicle 106 from making a lane change.

To determine that the driver of vehicle 106 is distracted, warning system 100 may analyze the return (or backscatter)

signal. For example, as vehicle 106 is moving away from center of road lane 102, the return signal becomes weaker. The change in the signal is given by the plotted function shown in FIG. 2. This weaker signal may indicate that vehicle 106 is drifting away from road lane 102. More particular, the rate of change of the return signal, i.e., the rate at which the strength of the return signal drops, indicates how fast vehicle 106 is moving away from center of road lane 102. A slower rate may indicate that the driver is distracted, and a correction may be required. A correction for purposes of explanation may be taking control from the driver and moving vehicle 106 back to center of road lane 102. Another correction technique that may be employed would be to warn the driver of any unintended movements through either audio signals, vibrating signals (e.g., vibrating the steering wheel or chair of the driver), or both.

Since there are curves in the road, the embodiments described herein will work on curves because the curved road will also have curved embedded grooves. For example, signals are captured from transceiver 108 at periodic intervals (more when at higher speeds) and compared with prior data. Small changes are routinely sent to the steering mechanism to keep the car aligned on the invisible track. Consequently, a curved road should not derail the car from the invisible track, because the system is always trying to maintain lock. However, if the curve is too abrupt (i.e., left/right turn), the connection to the invisible track may be partially cutoff (i.e., no grooves 104 at an intersection). However, intersections with power (i.e. lights) can be upgraded with a location navigation system or coordinate system that allows an autonomous car to make the necessary left/right turns. For example, as a vehicle approaches the intersection, invisible RF "markers" broadcast may serve as a guide as vehicles make sharp turns (i.e., left/right). Initially, these markers would serve as guides (e.g., left/right turn under driver control), but as technology advances, one of ordinary skill in the art may foresee turns under automated control. After a turn is negotiated, the car may re-couple to the invisible track present in the new lane. However, there may be modifications to the proposed technology that can remove ambiguity when traversing a gentle bend.

Figure 3:
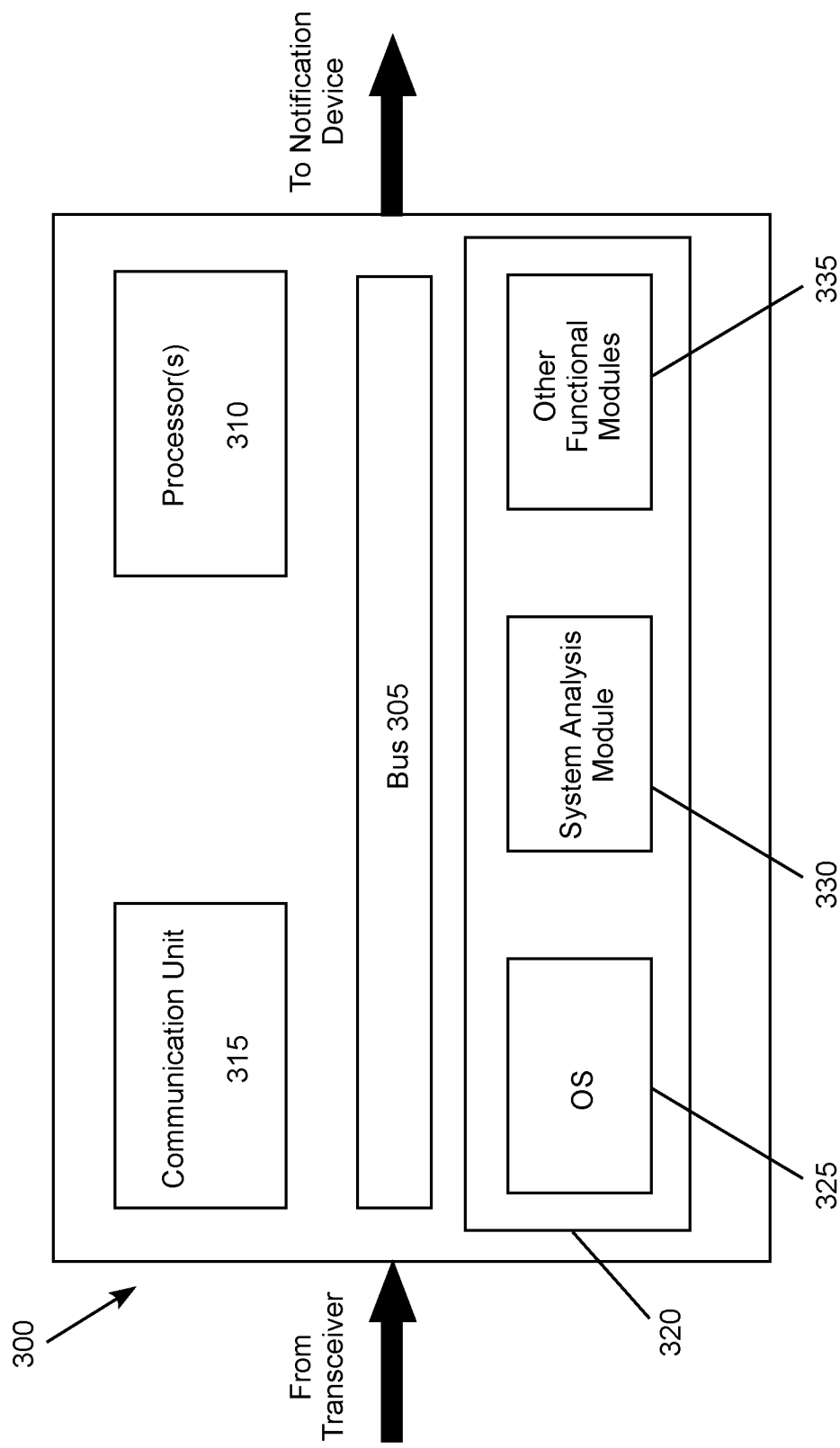
FIG. 3 is a block diagram illustrating a warning system, according to an embodiment of the present invention.

To separate an intended lane change from an unintended lane change, the following is taken into consideration by warning system 100. For example, for an intended lane change, the presence of a turn signal or an abrupt change in angular rate of motion is considered. In another embodiment, two transceivers may be mounted on the undercarriage of vehicle 106. For example, a first transceiver may be mounted on front of vehicle 106 and a second transceiver may be mounted on back of vehicle 106. This may allow warning system 100 to compare the signal strength between the front transceiver and the back transceiver, enabling the separation from of an inadvertent or signal change of road curvature. In such an embodiment, there may be a larger change in the signal strength for the former case because the front transceiver (where steering control typically resides in front wheel controlled vehicles) would have been "unhinged" while the rear transceiver is not. Additional resilience may be realized if the lanes had two sets of MIGs with the first transceiver locked on a first MIG and the second transceiver locked on the second MIG FIG. 1B is a cross-sectional view of warning system 100 used on the roadway, according to an embodiment of the present invention. In this embodiment, vehicle 106 is positioned within lane 102, which includes MIGs 104. In some embodiments, and as shown in FIG. 1B, 3 MIGs may be used in connection with warning system 100. In other embodiments, additional MIGs 104 may be used. For higher signal to noise ratio, 3 or more MIGs may be used. Also, in this embodiment, transceiver 108, which is mounted on the undercarriage of vehicle 106, is pointed at an angle. The angle may be defined by length (B) and height (A). Length B may be defined as the distance from the center of MIGs 104 to transceiver 108, and height (A) may be defined as the distance from the transceiver 108 to roadway 102. For maximum signal return, the angle must be at the Littrow angle, i.e., the angle where a diffracted order from a corrugated surface returns toward the signal emitting source. FIG. 1B also shows an upward pointing arrow with + and − defining the diffracted orders (+) or (−) about a vector which is normal to the road surface.

Below is a first order equation for determining the $P_r$ power received from the backscatter.

$$P_r = (P_t G_r G_t \lambda^2 \sigma) / ((4\pi)^3 R_t^2 R_r^2 L) \quad \text{Equation (2)}$$

where $P_t$ is defined as power transmitted, $G_r$ and $G_t$ are defined as the gain of the received and transmitted signals, respectively, $\lambda$ is the transceiver wavelength, and $\sigma$ is the cross-section or the percentage of return. For purposes of explanation only, if $P_t$ is 1 watt, the $G_t$ is 1, $G_r$ is 10, and the range transmitted $R_t$, range is the same as the received $R_r$, distance and L is a loss factor and we pick a value for $\sigma$ (scattering cross-section) for RF scattering from a metal beam. We can determine the maximum power to be received. However, the calculated power received ($P_r$) is also a function of angle, and is shown in FIG. 2.

Figure 2:
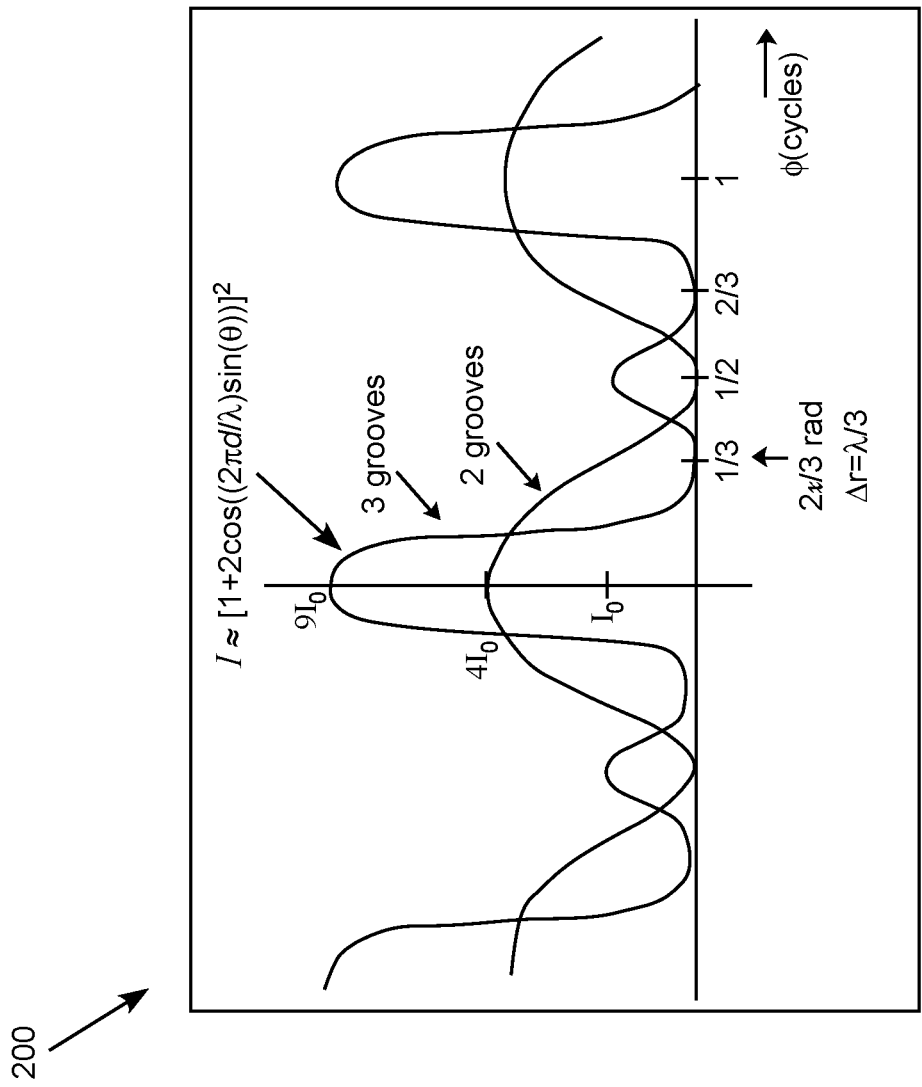
FIG. 2 is a graph illustrating results of a calculation for the expected signal return as a function angle (theta) for a 2 MIG and 3 MIG road, according to an embodiment of the present invention.

FIG. 2 is a graph 200 illustrating results of a calculation for the expected signal return as a function angle (theta) for a 2 MIG and 3 MIG road, according to an embodiment of the present invention. For purposes of explanation, the equation for 3 groove MIGs is shown in FIG. 2. This equation is cast such that (1) is the measured signal return as a function of angle (θ) from the roadway for a given transceiver having wavelength (λ) and MIG groove spacing (d). If ($I_0$) can be defined as the maximum signal intensity sent out from the transceiver, the equations show that at particular angles the signal returned to the transceiver can be larger than Jo, namely $4*I_0$ for a 2 MIG road and $9*I_0$ for a 3 MIG road. In some embodiments, for maximum return of the transceiver signal from the MIGs, the transceiver output beam should be at a particular angle defined by these equations.

Simply put, graph 200 shows how the expected received power varies as a function of angular motion of the transceiver. FIG. 3 is a block diagram illustrating a warning system 300 for determining whether a driver is distracted, according to one embodiment of the present invention. Warning system 300 may include a bus 305 or other communication mechanism configured to communicate information among many integrated modules, and at least one processor 310, coupled to bus 305, configured to process information. At least one processor 310 can be any type of general or specific purpose processor. Warning system 300 may include a signal analysis unit that analyzes the signals received and performs near real time comparison with prior data. The signal analysis unit may acquire the transceiver signal and make a decision to forewarn.

The transceiver (not shown) is typically a pulsed or CW radar operating at RF gigahertz (GHz) frequencies, for example. In some embodiments, the signal analysis unit may include an RF and electronic bus 305 that is connected to various necessary components. For example, at least one processor 310 may execute an operating system (OS) 325, and communication unit 315 may analyze the RF signal strength in relation to the expected result. See, for example, FIG. 2.

Signal analysis module 330 may compare the signal strength with data taken several moments ago. If the signal strength is not optimum, signal analysis module 330 may send a signal alerting the driver or in automated fashion slightly change the driving wheel angle to maximize the signal return. If the lane change is not inadvertent (e.g., the turn signals are on), then no action is taken. It should be appreciated that other safety sensors, such as blind-spot monitoring, may be integrated with the output of signal analysis module 330 to provide a more situational awareness (i.e., data from an on-board navigation system). These other sensors, devices, and/or warning systems may be part of the other functional modules 335.

As discussed above, warning system 300, which includes memory 320 may store information and instructions to be executed by at least one processor 310. Memory 320 can be comprised of any combination of random access memory ("RAM"), read only memory ("ROM"), static storage such as a magnetic or optical disk, or any other type of computer readable medium. Warning system 300 may also include a communication device 315 to receive signal data from the transceiver, and communicate to the driver through audio, visual, or vibrating signals, when the driver is distracted. Warning system may also include taking direct control system of the car steering mechanism to forego communication to the driver but to make steering adjustments under certain conditions.

The computer readable medium may be any available media that can be accessed by at least one processor 310. The computer readable medium may include both volatile and nonvolatile medium, removable and non-removable media, and communication media. The communication media may include computer readable instructions, data structures, program modules, or other data and may include any information delivery media. An example could be data from the vehicle navigation system that has information on the road path ahead (in relation to the vehicle location).

According to an embodiment, memory 320 may store software modules that may provide functionality when executed by at least one processor 310. The modules can include an operating system 325 and a warning system module 330, as well as other functional modules 335. Operating system 325 may provide operating system functionality for warning system 300, and system analysis module 330 may detect whether the driver of the vehicle is distracted, and if so, may transmit audio signals, vibrating signals, or both. In certain embodiments, signal analysis module 330 may also take temporary control of the vehicle in order to perform corrective vehicle measures such as keeping the vehicle on the road lane. Because warning system 300 may be part of a larger system, warning system 300 may include one or more additional functional modules 335 to include the additional functionality as discussed above.

It should be noted that some of the warning system features described in this specification have been presented as modules, in order to more particularly emphasize their implementation independence. For example, a module may be implemented as a hardware circuit comprising custom very large scale integration (VLSI) circuits or application specific integrated circuits (ASICs) or gate arrays, off-the-shelf semiconductors such as logic chips, transistors, or other discrete components. A module may also be implemented in programmable hardware devices such as field programmable gate arrays, programmable array logic, programmable logic devices, direct use of analog circuits, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 4:
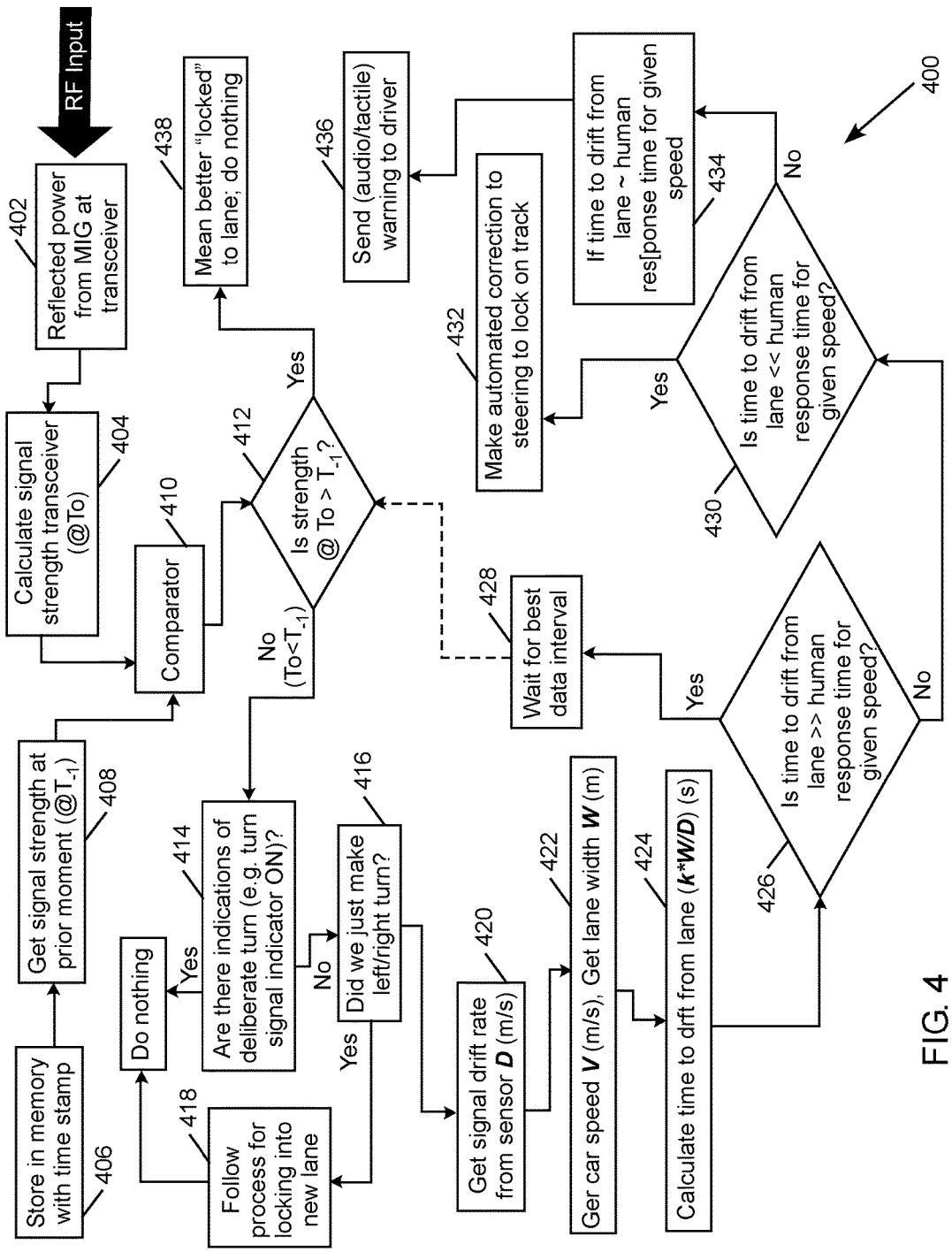
FIG. 4 is a flow diagram illustrating a process for warning a distracted driver, according to an embodiment of the present invention.

FIG. 4 is a flow diagram illustrating a process 400 for warning a distracted driver, according to an embodiment of the present invention. In some embodiments, process 400 may begin at 402 with the transceiver receiving the reflected signal from the MIGs. At 404, the warning system (or transceiver) calculates the signal strength at time $T_0$, and at 406, stores the calculated signal strength along with a time stamp in memory. At 408, the warning system retrieves the signal strength from a prior moment at time $T_{-1}$, and, at 410, a comparator, which may be part of warning system, computes the difference between the signal strength at time $T_0$ and time $T_{-1}$, and at 412, compares the difference between the signal strength at time $T_0$ and time $T_{-1}$. If the signal strength at time $T_0$ is greater than the signal strength at $T_{-1}$, then the warning system continues to monitor. If the signal strength at time $T_0$ is less than the signal strength at $T_{-1}$, then the warning system determines if there are indications of a deliberate turn at 414. If there are indications of a deliberate turn or movement, then the warning system continues to monitor.

If the warning system determines that the turn or movement was not deliberate, then at 416, the computing system determines if the vehicle made a right turn or left turn. If the vehicle made a right or left turn, then at 418, the warning system locks into the new lane, and continues to monitor. If the vehicle did not make a right or left turn, then at 420, the warning system retrieves the drift rate D (m/s) from the onboard sensor of the vehicle, and at 422, the warning system retrieves the speed of vehicle V (m/s) and the width W (meters) of the road lane. At 424, the warning system computes the drift time $T_D(s)$ from road lane using the following equation $$T_D = k*W/D \qquad \text{Equation (3)}$$

where k is a constant, W is the width of the road lane, and D is the drift rate of the vehicle. At 426, the warning system determines if the time to drift from the lane is much larger (>>) than the human response time given the vehicle speed. The human response time may depend on the driver of vehicle, such as driver age, driver vision and mental state, or any other variable that may be appreciated by a person of ordinary skill in the art. If so, the warning system waits for the next data interval at 428 and returns to step 412. Otherwise, the warning system determines at 430 if the time to drift from road lane is much less (<<) than the human response time for the given speed. If so, the warning system at 432 performs corrective measures without driver assistance to lock the vehicle on the invisible track. Otherwise, at 434, warning system determines if that the drift time is approximate to the human response time for a given speed, then if so, at 436, the warning system may transmit an audible or tactile warning to the driver.

The process shown in FIG. 4 may be performed, in part, by a computer program, digital and analog logic, ASICs, or another form encoding instructions that uses a nonlinear adaptive processor to cause at least the process described in FIG. 4 which implements the logic that is described in warning system 300 of FIG. 3. The computer program may be embodied on a non-transitory computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC"). In some embodiments, a system for reducing accidents caused by distracted drivers may include an invisible track formed by MIGs and a radar beam, preventing a vehicle from veering away from a road lane. The MIGs within one or more road lanes may include scrap metal. The radar beam may be emitted from a transceiver mounted underneath the vehicle such that backscatter from the MIGs is returned to the transceiver Also, some embodiments may capture the reflected RF signal from the MIGs and quantify the capture RF signal as a signal strength $T_0$ (time stamp). This signal strength may then be compared with data from a prior moment, defined as $T_{-1}$ which was previously stored in memory. If the signal strength is less than the data from a prior time, additional queries may be conducted to see if the driver is making a deliberate lane change (e.g., signal indicator lights on) and/or if the driver has just made an abrupt large-angle change (e.g., left/right turn). If both queries return a NO or negative, then the processor captures the lane drift rate data (either from an angular rate meter, MEMS, on board, or may calculate from the data stored in memory), the car speed and knows the lane width and relative distance to the MIGs. The processor may also calculate the time to drift from the lane. This time is compared to human response times (information stored in memory from human test trials done). If the lane drift time is much larger (>>) than the human response time, the processor waits for next data interval. However, if the drift time is much less (<<) than the human response time, then the automated steering correction mechanism takes over to bring the car back on the invisible track. Finally, if the time to drift lane is on the order of human response time, then an audio/tactile warning is sent to the driver.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system for reducing distracted driver accidents, comprising:
   an invisible track formed by a series of continuous material-impregnated grooves filled with material that reflects a radar beam, preventing a vehicle from veering away from a road lane, wherein the each of the series of continuous material-impregnated grooves are parallel along a path of the road lane; and
   a transceiver mounted underneath the vehicle emitting a radar or radio frequency (RF) beam toward the series of continuous material-impregnated grooves, such that backscatter RF intensity reflected from the series of continuous material-impregnated grooves is returned to the transceiver, wherein
   the emitted radar or RF beam is angled to create a Littrow configuration between the continuous material-impregnated grooves and the transceiver enabling an electronic connection that ties the vehicle to the road lane, and the tying of the vehicle to the road lane is realized by a relationship between a location of the continuous material-impregnated grooves, a location of the transceiver, and energy from the backscattered RF intensity.

2. The system of claim 1, wherein the series of continuous material-impregnated grooves comprise scrap metal turnings as reflective material.

3. The system of claim 2, wherein the scrap metal within the series of continuous material-impregnated grooves is sealed using a paste, the paste comprising a sealant and the reflective material.

4. The system of claim 1, wherein the transceiver is positioned at a predetermined angle such that the emitted beam hits the series of continuous material-impregnated grooves, maximizing the retuned backscatter.

5. The system of claim 4, wherein the returned backscatter is Littrow condition, where one of orders of the returned backscatter is returned at a same angle as the emitted beam.

6. The system of claim 5, wherein the one of order is m=+1 to achieve maximum backscatter for the predefined angle, where m is a brightest reflected order.

7. The system of claim 1, wherein the transceiver is placed on a mechanical swivel facilitating auto-alignment of the transceiver with the series of continuous material-impregnated grooves.

8. The system of claim 1, wherein the transceiver is electronically steered such that the radar or RF beam is auto-aligned with the series of continuous material-impregnated grooves.

9. The system of claim 1, further comprising:
a warning system configured to monitor strength of the returned backscatter to determine if the vehicle is veering off the road lane without driver deliberate maneuvers.

10. The system of claim 9, wherein the warning system is further configured to continue monitoring human response time when a drift rate from the road lane is larger than the human response time for a particular speed at which the vehicle is traveling and for driver's age, driver vision and mental state.

11. The system of claim 10, wherein the warning system is further configured to make automated corrections to the vehicle when the drift rate from the road lane is less than the human response time for the particular speed at which the vehicle is traveling and for the driver's age, driver vision and mental state.

12. The system of claim 11, wherein the warning system is further configured to transmit audio or tactile warning signals to the driver of the vehicle when the drift rate from the road lane is approximately equal to the human response time for a particular speed at which the vehicle is traveling and for the driver's age, driver vision and mental state.

13. The system of claim 9, wherein the warning system is further configured to transmit an audible signal, a vibrating signal, or both, to a driver depending on a rate of change of the returned backscatter in comparison to data taken moments just prior to the rate of change in the returned backscatter.

14. The system of claim 9, wherein the warning system is further configured to temporarily take over control of the vehicle depending on the rate of change of the returned backscatter signal.

15. A system for mitigating accidents caused by a distracted driver, comprising:
a plurality of continuous grooves within one or more road lanes, wherein each of the plurality of continuous grooves are filled and sealed with material that reflects radar or radio frequency (RF) beam and are parallel along a path of the road lane;
a transceiver mounted on an underside of a vehicle, and positioned at an angle to emit a beam angled to create a Littrow configuration between the plurality of continuous grooves and the transceiver enabling an electronic connection that ties the vehicle to the road lane, wherein the tying of the vehicle to the road lane is realized by a relationship between location of the plurality of continuous grooves, location of the transceiver, and backscattered energy; and
a warning system configured to perform the vehicle corrections when the driver is distracted.

16. The system of claim 15, wherein the vehicle corrections comprise transmission of audio signals, vibrating signals, or both, to the driver of the vehicle.

17. The system of claim 15, wherein the vehicle corrections comprise temporarily taking control away from the driver of the vehicle by the warning system to prevent the vehicle from veering away from a road lane.

18. The system of claim 15, wherein the transceiver is positioned at a predetermined angle such that the emitted beam hits the material within the plurality of continuous grooves, maximizing the retuned backscatter,
the returned backscatter is Littrow condition, where one of orders of the returned backscatter is returned at a same angle as the emitted beam.

19. The system of claim 15, wherein the transceiver is placed on a mechanical swivel facilitating auto-alignment of the transceiver with the material within the plurality of continuous grooves.

20. The system of claim 15, wherein the transceiver is electronically steered such that the radar beam is auto-aligned with the material within the plurality of continuous grooves.

21. The system of claim 1, wherein the invisible track is placed at any location between the road lane.

22. The system of claim 15, wherein the plurality of continuous grooves are placed at any location between the one or more road lanes.

* * * * *